(No Model.)

T. B. PHELPS.
DUST GUARD FOR CAR JOURNAL BOXES.

No. 559,984. Patented May 12, 1896.

WITNESSES:
J. F. Finch.
M. L. Longden.

INVENTOR
Theodore B. Phelps
BY
ATTY

UNITED STATES PATENT OFFICE.

THEODORE B. PHELPS, OF BREWSTER, NEW YORK.

DUST-GUARD FOR CAR JOURNAL-BOXES.

SPECIFICATION forming part of Letters Patent No. 559,984, dated May 12, 1896.

Application filed November 29, 1895. Serial No. 570,493. (No model.)

*To all whom it may concern:*

Be it known that I, THEODORE B. PHELPS, a citizen of the United States, residing at Brewster, in the county of Putnam and State of New York, have invented certain new and useful Improvements in Dust-Guards for Car Journal-Boxes; and I do hereby declare the following to be a full, clear, and exact description of the invention, such as will enable others skilled in the art to which it appertains to make and use the same.

My invention relates to certain new and useful improvements in dust-guards for car journal-boxes, and has for its object to so construct such guards that the rawhide or other similar material employed therein for making a close joint around the car-axle may be easily and quickly renewed from time to time as the same becomes worn out. In devices of this description the rawhide washer employed is really the only part that is subjected to any great wear, and in my present invention I have constructed the guard in such manner that said washers may be readily renewed without inconvenience.

Figure 1:
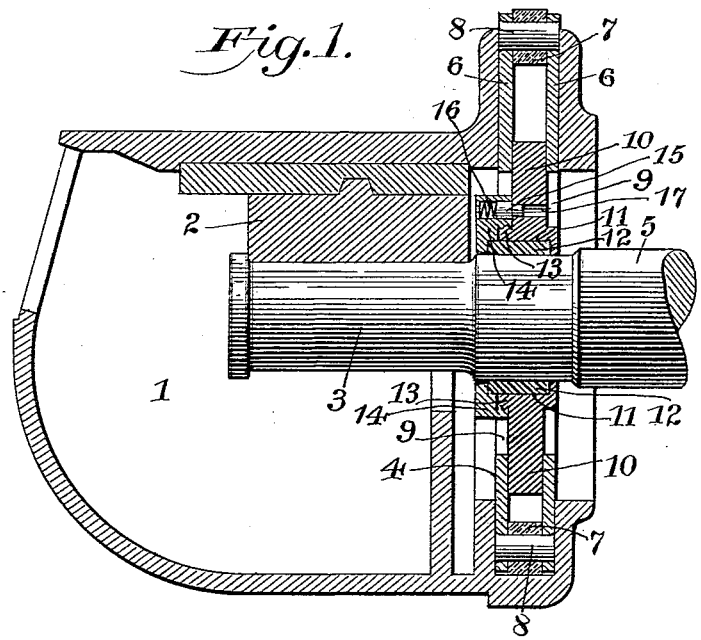
Figure 2:
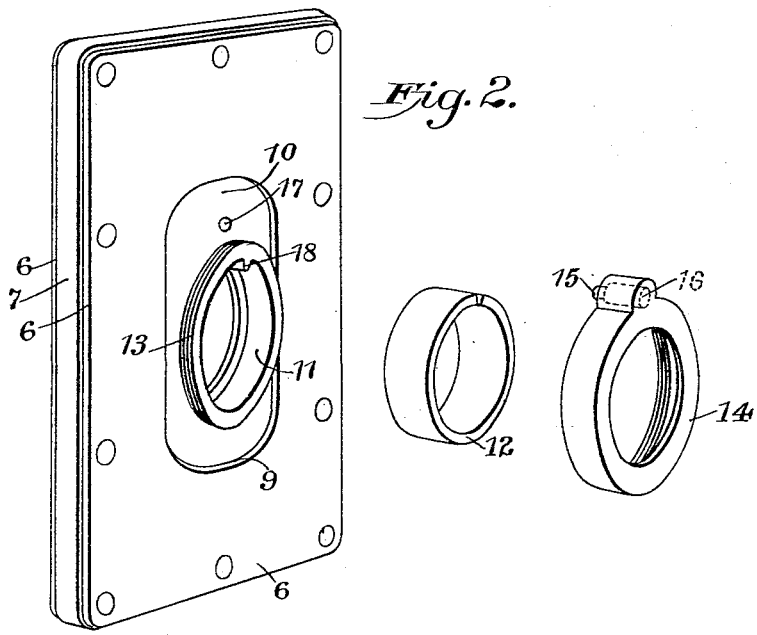

Referring to the accompanying drawings, which form a part of this specification, Figure 1 is a sectional elevation of a car journal-box equipped with my improvement, and Fig. 2 a perspective view of the dust-guard with the rawhide washer and securing-ring in detached position.

Similar numbers of reference denote like parts in both figures of the drawings.

1 is the car journal-box, of any approved pattern, within which is the usual bearing-block 2.

3 is the journal formed on the end of the car-axle upon which the block 2 rests.

4 is a chamber formed in the box at a point between the wheel-seat 5 on the axle and the journal 3, and within this chamber is secured my improved dust-guard.

6 6 are two plates of metal separated by a gasket 7, of leather or other suitable material, said plates and gasket being secured together in any desirable manner, as by rivets 8. The combined thickness of the plates 6 6 and gasket 7 is such as to completely fill the chamber 4 as to the width of the same, and the edges of the gasket 7 protrude beyond the edges of the plates 6 6, so that when the guard is forced within the chamber 4 a tight joint will be effected between the walls of said chamber and said plates. The plates 6 6 are provided with openings 9, through which the journal protrudes within the box. The openings 9 are preferably of an oblong shape, the long diameter of such oblong being in a vertical plane, for the reason that the vertical movements of the journal are much greater than the horizontal movements of the same.

10 is a slide made of metal of such thickness as to completely fill the space between the two plates 6 6, and said slide is capable of moving in any direction in the same vertical plane between said plates.

11 is an annular recess formed in the central portion of the slide 10, and 12 is a rawhide washer or packing-ring fitted within such recess so as to surround the inner end of the journal 3. From the wall at the top of this annular recess projects a rib or feather 18, and the packing-ring is preferably formed from a strip of rawhide curled into ring form and inserted within this recess so that the ends of the strip are on opposite sides of said rib, whereby the packing-ring is securely held as against rotation.

13 is an annular screw-threaded flange formed on the face of the slide 10, and 14 is a securing-ring interiorly threaded and adapted to be screwed upon the flange 13 to secure the packing-ring within the recess 11.

15 is a spring-actuated pin seated within a recess 16 in the face of the ring 14, and 17 is a hole in the face of the slide 10, into which the end of the pin 15 is projected when the ring 14 has been screwed down tight upon the flange 13, so as to lock said ring as against backing off.

Heretofore in devices of this description it has been necessary to remove the entire guard in order to repair the same, and this operation was of course no easy task, because when said guard is placed within the journal-box it is driven in the guard-chamber so tightly (in order to effect the tight joint required, so that no oil may escape from said box when in use, and also that dust and other foreign matter may be excluded from the same) that it is almost impossible to remove said guard without demolishing it.

As previously stated, the only part that is subjected to any great wear is the packing-ring or rawhide washer which surrounds the journal, and in order to renew a worn-out packing-ring in my improved construction it is only necessary to jack the car up and remove the bearing-block. The securing-ring 14 may then be unscrewed and the worn-out packing removed and a new one inserted. The parts may then be restored to their proper positions without any great inconvenience.

Having thus described my invention, what I claim as new, and desire to secure by Letters Patent, is—

1. In a dust-guard for journal-boxes, the combination of the plates 6 having openings centrally located therein and separated by a gasket of suitable material, said gasket and plates being properly secured together, the slide 10 held in position between said plates and capable of moving in any direction between the same, the packing-ring seated within a recess in said slide and surrounding the axle-journal, and means for holding said packing-ring within said recess, substantially as set forth.

2. The combination of the plates properly secured together, the slide capable of moving in any direction in the same vertical plane between said plates, the packing-ring seated within an annular recess in said slide and surrounding the axle-journal, and a threaded ring adapted to take within threads carried on said slide whereby said packing-ring is secured in proper position, substantially as set forth.

3. The combination of the plates properly secured together and having centrally-located openings, the slide supported between said plates, the packing-ring seated in an annular recess in said slide and surrounding the axle-journal, the threaded ring adapted to take upon a threaded flange on said slide, and means for locking said ring as against backing off, substantially as set forth.

4. The combination of the plates having centrally-located openings therein, the slide supported between said plates and provided with a central opening for the passage of the axle-journal, the packing-ring seated in an annular recess in said slide and surrounding said axle-journal, the threaded ring adapted to take upon a threaded flange on said slide whereby said packing-ring is secured in proper position and a spring-actuated pin carried by the threaded ring and adapted to be projected within a hole in said slide, substantially as and for the purpose set forth.

5. The combination of the plates 6, 6, the slide supported between said plates, the packing-ring seated within an annular recess in said slide and surrounding the axle-journal, a rib or feather at the top of said annular recess whereby said packing-ring is held as against rotation, and a threaded ring adapted to take upon a threaded flange on said slide, whereby said packing-ring is secured in proper position, substantially as set forth.

In testimony whereof I affix my signature in presence of two witnesses.

THEODORE B. PHELPS.

Witnesses:
J. S. FINCH,
M. T. LONGDEN.